R. C. Hussey,
Leather Cutting Board,
N° 57,513. Patented Aug. 28, 1866.
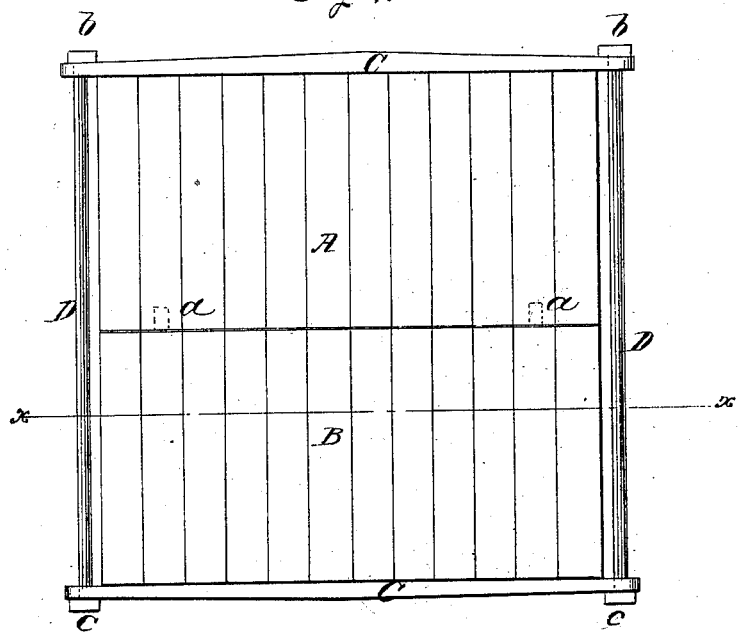
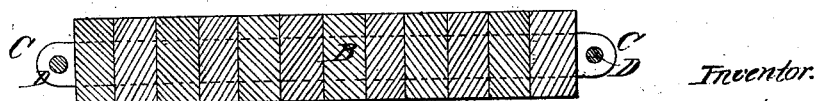
Witnesses.
Jas. A. Service
J. W. B. Carrington
Inventor.
R. C. Hussey
Per Munn & Co
Attorneys

UNITED STATES PATENT OFFICE.

ROLAND C. HUSSEY, OF MILFORD, MASSACHUSETTS.

IMPROVED CUTTING-BOARD.

Specification forming part of Letters Patent No. 57,513, dated August 28, 1866.

*To all whom it may concern:*

Be it known that I, ROLAND C. HUSSEY, of Milford, in the county of Worcester and State of Massachusetts, have invented a new and Improved Cutting-Board; and I do hereby declare that the following is a full, clear, and exact description thereof, which will enable others skilled in the art to make and use the same, reference being had to the accompanying drawings, forming part of this specification, in which—

Figure 1 is a plan or top view of two sections of a cutting-board made and bound together according to my invention. Fig. 2 is a cross-section, taken on the line $x\,x$, Fig. 1.

Similar letters of reference indicate like parts.

The object of my invention is to produce a good and durable cutting-board—one on which to lay out and cut leather in the manufacture of boots and shoes.

My invention consists in the means I employ for clamping several sections together so as to produce a board of any given size.

A and B designate two separate sections of a cutting-board, and each section is comprised of several blocks, evenly trimmed or planed, and secured together with the ends uppermost.

In preparing the stock for use I have found it expedient to proceed as follows: The stock is first cut up into blocks of the desired size. These are placed on racks in a room which is a little damp, where it remains from one to three months. The blocks are then removed and placed in a room of the ordinary temperature—say, about 50° Fahrenheit—where they will gradually dry, a month or six weeks being allowed for the purpose. They are then removed and placed in a hotter room, the temperature being at about 100° Fahrenheit, where they are allowed to remain about a fortnight.

After the blocks have been thus seasoned they are planed true, and glued together so as to form sections, as illustrated by A B. These sections are then planed off true upon each side, and two or three or more, according to the size, are jointed, bored, and doweled, as shown at $a\,a$, Fig. 1. They are then clamped together, and the board is in the proper shape for the cutting-room of a boot and shoe manufactory.

The clamping device consists of two bars, C, of metal or wood, of the proper length to stretch across one side of the board. Through their ends holes are made, and through them run rods D, having heads $b$ on the one end and nuts $c$ on the other, by which to tighten them and lock up the frame, so as to hold the sections firmly and closely together.

I am aware that blocks, logs, &c., with the end uppermost, have been used for cutting and chopping blocks; but these have nothing to do with my invention.

I believe myself to be the first who has successfully seasoned the blocks before uniting them, so that they will stand the heat of a boot-manufactory, and also the moisture of the leather, without either warping, cracking, or being otherwise injured.

By clamping together two or more sections I form a large board, on which the workman can cut out his work; and if at any time he desires a smaller one—merely a section—the clamping-rods can be readily removed. Also, this manner of clamping the sections together provides a ready means for supporting them, so that they can be planed off true by machinery after they have become cut up.

What I claim as new, and desire to secure by Letters Patent, is—

The manner of clamping together two or more seasoned sections, A B—that is, by using two bars, C, and rods D, carrying nuts $c$, by which the sections may be held closely together, substantially as specified.

ROLAND C. HUSSEY.

Witnesses:
ZENAS E. BALL,
GEO. G. PARKER.